US006408269B1

(12) United States Patent
Wu et al.

(10) Patent No.: US 6,408,269 B1
(45) Date of Patent: Jun. 18, 2002

(54) FRAME-BASED SUBBAND KALMAN FILTERING METHOD AND APPARATUS FOR SPEECH ENHANCEMENT

(75) Inventors: Wen-Rong Wu, Hsinchu; Po-Cheng Chen, San-Chong; Hwai-Tsu Chang, Hsinchu; Chun-Hung Kuo, Tainan, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/261,396

(22) Filed: Mar. 3, 1999

(51) Int. Cl.[7] .......................... G10L 21/02; H04B 15/00
(52) U.S. Cl. ....................................... 704/228; 381/94.3
(58) Field of Search .......................... 704/228; 381/94.2

(56) References Cited

U.S. PATENT DOCUMENTS

| | | | | |
|---|---|---|---|---|
| 4,185,168 A | * | 1/1980 | Graupe et al. | 381/318 |
| 4,472,812 A | * | 9/1984 | Sakaki et al. | 375/232 |

OTHER PUBLICATIONS

Bor–Sen Chen et al. "Optimal Signal Reconstruction in Noisy Filter Bank Systems: Multirate Kalman Synthesis Filtering Approach", IEEE Trans. Signal Processing, vol. 43, No. 11, p. 2496–2504, Nov. 1995.*

Wen–Rong Wu et al. "Subband Kalman Filtering for Speech Enhancement," IEEE Trans. Circuits and Systems–II: Analog and Digital Signal Processng, vol. 45, No. 8, p. 1072–1083, Aug. 1998.*

K.K. Paliwal, et al., "A Speech Enhancement Method based on Kalman Filtering," Proc. IEEE Int. Conf. Acoust., Speech, Signal Processing, Apr. 1987, pp. 177–180.

J.D. Gibson, et al. "Filtering of Colored Noise for Speech Enhancement and Coding," IEEE Trans, Signal Processing, vol. 39, No. 8, Aug. 1991, pp. 1732–1741.

B. Lee, et al., "An EM–based Approach for Parameter Enhancement with an Application to Speech Signals," Signal Processing, vol.. 46, No. 1, Sep. 1995, pp. 1–14.

M. Niedzwiecki, et al., Adaptive Scheme for Elimination of broadband Noise and Impulsive Disturbance from AR and ARMA Signals, IEEE Trans. Signal Processing, vol. 44, No. 3, Mar. 1996, pp. 528–537.

* cited by examiner

*Primary Examiner*—Tālivaldis Ivars Šmits
(74) *Attorney, Agent, or Firm*—Stevens, Davis, Miller & Mosher, LLP

(57) ABSTRACT

A method and apparatus for enhancing a speech signal contaminated by additive noise through Kalman filtering. The speech is decomposed into subband speech signals by a multichannel analysis filter bank including bandpass filters and decimation filters. Each subband speech signal is converted into a sequence of voice frames. A plurality of low-order Kalman filters are respectively applied to filter each of the subband speech signals. The autoregression (AR) parameters which are required for each Kalman filter are estimated frame-by-frame by using a correlation subtraction method to estimate the autocorrelation function and solving the corresponding Yule-Walker equations for each of the subband speech signals, respectively. The filtered subband speech signals are then combined or synthesized by a multichannel synthesis filter bank including interpolation filters and bandpass filters, and the outputs of the multichannel synthesis filter bank are summed in an adder to produce the enhanced fullband speech signal.

26 Claims, 3 Drawing Sheets

FRAME-BASED SUBBAND KALMAN FILTERING METHOD AND APPARATUS FOR SPEECH ENHANCEMENT

BACKGROUND OF THE INVENTION

1. Field of the Invention

This invention relates generally to the processing of speech signals. More specifically, the present invention is concerned with a method and apparatus for enhancing a speech signal contaminated by additive noise while avoiding complex iterations and reducing the required signal processing computations.

2. Description of the Prior Art

Speech signals used in, e.g., digital communications often need enhancement to improve speech quality and reduce the transmission bandwidth. Speech enhancement is employed when the intelligibility of the speech signal is reduced due to either channel noise or noise present in the environment (additive noise) of the talker. Speech coders and speech recognition systems are especially sensitive to the need for clean speech; the adverse effects of additive noise, such as motorcycle or automobile noise, on speech signals in speech coders and speech recognition systems can be substantial.

Additionally, speech enhancement is particularly important for speech compression applications in, e.g., computerized voice notes, voice prompts, and voice messaging, digital simultaneous voice and data (DSVD), computer networks, Internet telephones and Internet speech players, telephone voice transmissions, video conferencing, digital answering machines, and military security systems. Conventional approaches for enhancing speech signals include spectrum subtraction, spectral amplitude estimation, Wiener filtering, HMM-based speech enhancement, and Kalman filtering.

Various methods of using Kalman filters to enhance noise-corrupted speech signals have been previously disclosed. The following references, incorporated by reference herein, are helpful to an understanding of Kalman filtering: [1] K. K. Paliwal et al., "A Speech Enhancement Method based on Kalman Filtering," Proc. IEEE Int. Conf. Acoust., Speech, Signal Processing, April 1987, pp. 177–180; [2] J. D. Gibson, et al., "Filtering of Colored Noise for Speech Enhancement and Coding", IEEE Trans. Signal Processing, vol. 39, no. 8, pp. 1732–1741, August 1991; [3] B. Lee, et al., "An EM-based Approach for Parameter Enhancement with an Application to Speech Signals," Signal Processing, vol. 46, no. 1 pp. 1–14, September 1995; [4] M. Niedźwiecki et al., "Adaptive Scheme for Elimination of Broadband Noise and Impulsive Disturbance from AR and ARMA Signals" IEEE Trans. Signal Processing, vol. 44, no. 3, pp. 528–537, March 1996.

Speech signals corrupted by white noise can be enhanced based on a delayed-Kalman filtering method as disclosed in reference [1], and speech signals corrupted by colored noise can be filtered based on scalar and vector Kalman filtering algorithms as disclosed in reference [2]. Reference [3] discloses a non-Gaussian autoregressive (AR) model for speech signals and models the distribution of the driving-noise as a Gaussian mixture, with application of a decision-directed nonlinear Kalman filter. References [1], [2] and [3] use an EM (Expectation-Maximization)-based algorithm to identify unknown parameters. Reference [4] assumes that speech signals are non-stationary AR processes and uses a random-walk model for the AR coefficients and an extended Kalman filter to simultaneously estimate speech and AR coefficients.

One main drawback of the above-referenced conventional Kalman filtering algorithms, in which speech and noise signals are modeled as AR processes and represented in a state-space domain, is that they require complicated computations to identify the AR parameters of the speech signal. In particular, in these conventional techniques, a high order AR model is required to obtain an accurate model of the speech signal; identification of AR coefficients and the application of the high-order Kalman filter all require extensive computations. In the conventional Kalman filtering technique, a Kalman-EM algorithm involving complex iterations is generally employed in the Kalman filter so that the AR parameters can be estimated. As a result, it is difficult and expensive to implement a speech enhancement system based on the conventional Kalman filtering technique. In fact, these drawbacks are so significant that the aforementioned Kalman filtering algorithms are still not suitable for practical implementation.

SUMMARY OF THE INVENTION

In view of the foregoing disadvantages of the prior art methods, it is an object of the present invention to provide a simple and practical method and apparatus for enhancing speech signals based on Kalman filtering while avoiding complex iterations and reducing the required computations and while maintaining comparable performance relative to the conventional Kalman-EM technique.

It is still another object of the present invention to model and filter speech signals in the subband domain such that lower-order Kalman filters can be applied, while employing a frame-based method to identify the AR parameters of the enhanced speech signals by first dividing each input observed subband signal into consecutive voice frames and then in each voice frame estimating the autocorrelation (AC) function of the enhanced subband signals by a novel correlation subtraction method of the present invention and applying a Yule-Walker equation to the AC function of the enhanced subband signals to obtain the derived AR parameters of the enhanced subband speech signals and carry out the subband Kalman filtering.

As noted above, the AC functions of the enhanced subband speech can be estimated frame-by-frame by a novel correlation subtraction method of this invention. This method first calculates the AC function of the observed noisy subband signal in each voice frame, and then in each voice frame obtains the AC function of the enhanced subband signal by subtracting the AC function of the subband noise from the AC function of the noisy subband signal. The AC function of the subband noise is calculated in a non-speech interval comprising at least one non-speech frame which is located at the beginning of the data sequence. It is assumed that the subband noise is stationary and, hence, that the AC function of the subband noise will not change. Thus, the same AC function for the subband noise is used in the application of the correlation subtraction method for all of the voice frames for that subband. The subtraction can be performed after the AC function of the subband noise is multiplied by $\alpha$, where $\alpha$ is a constant between zero and one. An advantage of this method is that no iteration is needed, and yet the performance is close to that achieved by employing an EM algorithm.

As noted previously, in conventional Kalman filtering techniques, to achieve a good model of the speech signal, a high order AR model is required. Thus, the computational complexity of the conventional Kalman filter is high. To solve this problem, the present invention decomposes the speech signal into subbands and performs the Kalman filtering in the subband domain. In each subband, only a low order AR model for the subband speech signal is used. The subband Kalman filtering scheme greatly reduces the computations and at the same time achieves good performance.

The speech enhancement apparatus of this invention includes a multichannel analysis filter bank for decomposing the observed noise-corrupted speech signal into subband speech signals. A plurality of parameter estimation units respectively estimate autoregressive parameters of each subband speech signal in accordance with a correlation subtraction method and a Yule-Walker equation and apply these parameters to filter each subband speech signal according to a Kalman filtering algorithm. Thereafter, a multichannel synthesis filter bank reconstructs the filtered subband speech signals to yield an enhanced speech signal.

The speech enhancement method of this invention includes decomposing the corrupted speech signal into a plurality of subband speech signals, estimating the autoregressive parameters of the subband speech signals, applying these parameters to filter the subband speech signals according to a subband Kalman filtering algorithm, and reconstructing the filtered subband speech signals into an enhanced speech signal.

Other features and advantages of the invention will become apparent upon reference to the following description of the preferred embodiments when read in light of the attached drawings.

BRIEF DESCRIPTION OF THE DRAWINGS

The present invention will be more clearly understood from the following description in conjunction with the accompanying drawings, where.

DESCRIPTION OF THE PREFERRED EMBODIMENT

Figure 1:
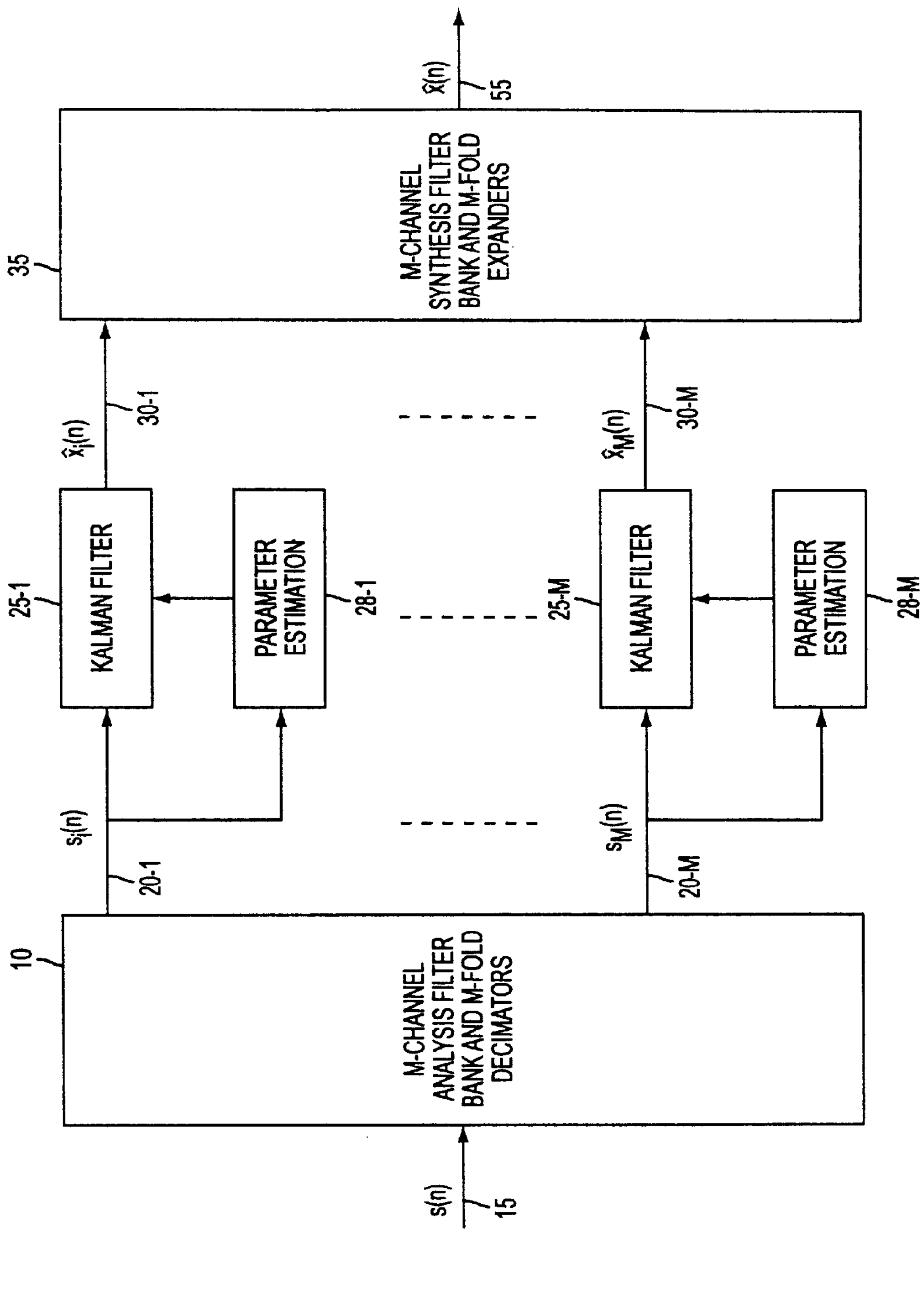
FIG. 1 is a block diagram of a preferred embodiment of the invention.

Before discussing the speech enhancement system of the present invention in detail, it may be helpful to review the conventional Kalman filtering of speech signals contaminated by additive white or colored noise.

On a short-time basis, a speech sequence {x(n)} can be represented as a stationary AR process given by a pth order autoregressive model $$x(n)=\sum_{i=1}^{p} a_i x(n-i)+w(n) \quad (1)$$

where w(n) is a zero-mean white Gaussian process with variance a $\sigma_w^2$. The observed or noise-corrupted speech signal s(n) is assumed to be contaminated by a zero-mean additive Gaussian noise v(n) (which is either white or colored but independent of x(n)) with variance $\sigma_v^2$. That is, $$s(n)=x(n)+v(n) \quad (2)$$

Let $$X(n) \triangleq [x(n)x(n-1) \ldots x(n-p+1)]^T,$$

then equations (1) and (2) can be reformulated in the state-space domain as $$X(n)=FX(n-1)+Gw(n) \quad (3)$$

$$s(n)=H^T X(n)+v(n) \quad (4)$$

$$F=\begin{bmatrix} a_1 & a_2 & \cdots & a_{p-1} & a_p \\ 1 & 0 & \cdots & 0 & 0 \\ 0 & 1 & \cdots & 0 & 0 \\ \vdots & \vdots & \ddots & \vdots & \vdots \\ 0 & 0 & \cdots & 1 & 0 \end{bmatrix}_{pxp} \quad (5)$$

$$G=H=[1\ 0\ \ldots\ 0]_{1xp}^T \quad (6)$$

Using this formulation, the optimal estimate of X(n) can be obtained from the Kalman filter, i.e., $$\hat{X}(n)=F\hat{X}(n-1)+K(n)[s(n)-H^T F\hat{X}(n-1)] \quad (7)$$

$$K(n)=M(n|n-1)H[L+H^T M(n|n-1)H]^{-1} \quad (8)$$

$$M(n|n-1)=FM(n-1)F^T+GQG^T \quad (9)$$

$$M(n)=[I-K(n)H^T]M(n|n-1) \quad (10)$$

where $\hat{X}(n)$ is the estimate of X(n), K(n) is the Kalman gain, M(n|n−1) is the state predication error covariance matrix, M(n) is the state filtering-error covariance matrix, I is the identity matrix, $L=\sigma_v^2$ is the noise variance and $Q=\sigma_w^2$ is the driving noise variance. A speech sample estimate at time instant n can then be obtained by $$\hat{x}(n)=H^T\hat{X}(n) \quad (11)$$

With regard to Kalman filtering of colored noise, assume that the colored noise is stationary, and can be described by a qth-order AR model as follows:

$$v(n)=\sum_{i=1}^{q} b_i v(n-i)+\eta(n) \quad (12)$$

where {η(n)} is a zero-mean white Gaussian process with variance $\sigma_{72}^2$. The AR parameters $B=[b_1 b_2 \ldots b_q]^T$ and $\sigma_\eta^2$ can be estimated during non-speech intervals and are assumed to be known. Then, equation (12) is expressed as a state-space representation and is incorporated into equations (3) and (4). The state-space representation of v(n) is similar to that in equation (1). Let $V(n)=[v(n)v(n-1) \ldots v(n-q+1)]^T$, then $$V(n)=F_v V(n-1)+g_v\eta(n) \quad (13)$$

$$v(n)=H_v^T V(n) \quad (14)$$

where $F_v$, $G_v$ and $H_v$ are identical to those in equations (5) and (6), except that $a_i$ and p are replaced by $b_i$ and q. Combining equations (13), (14), (3) and (4) yields $$\bar{X}(n)=\bar{F}\bar{X}(n-1)+\bar{G}\bar{W}(n) \quad (15)$$

$$s(n)=\bar{H}^T\bar{X}(n) \quad (16)$$

where $$\overline{X}(n)=\begin{bmatrix}X(n)\\V(n)\end{bmatrix},\ \overline{W}(n)=\begin{bmatrix}w(n)\\\eta(n)\end{bmatrix} \tag{17}$$

$$\overline{F}=\begin{bmatrix}F & 0\\0 & F_v\end{bmatrix},\ \overline{G}=\begin{bmatrix}G & 0\\0 & G_v\end{bmatrix} \tag{18}$$

$$\overline{H}^T=[H^T H_v^T] \tag{19}$$

The covariance matrix of $\overline{W}$(n) is defined as $$Q\triangleq E\left[\overline{W}(n)\overline{W}^T(n)\right]=\mathrm{diag}(\sigma_w^2,\sigma_\eta^2) \tag{20}$$

The Kalman equations for equations (15) and (16) are then obtained by setting a $\sigma_v^2=0$ and replacing $\hat{X}$(n), F, H, Q, and G with $\hat{\overline{X}}$, (n), $\overline{F}$, $\overline{H}$, $\overline{Q}$ and $\overline{G}$ in equations (7)–(10). The speech estimate is then $$\hat{x}(n)=[H^T 0]\,\hat{\overline{X}}(n) \tag{21}$$

Figure 2:
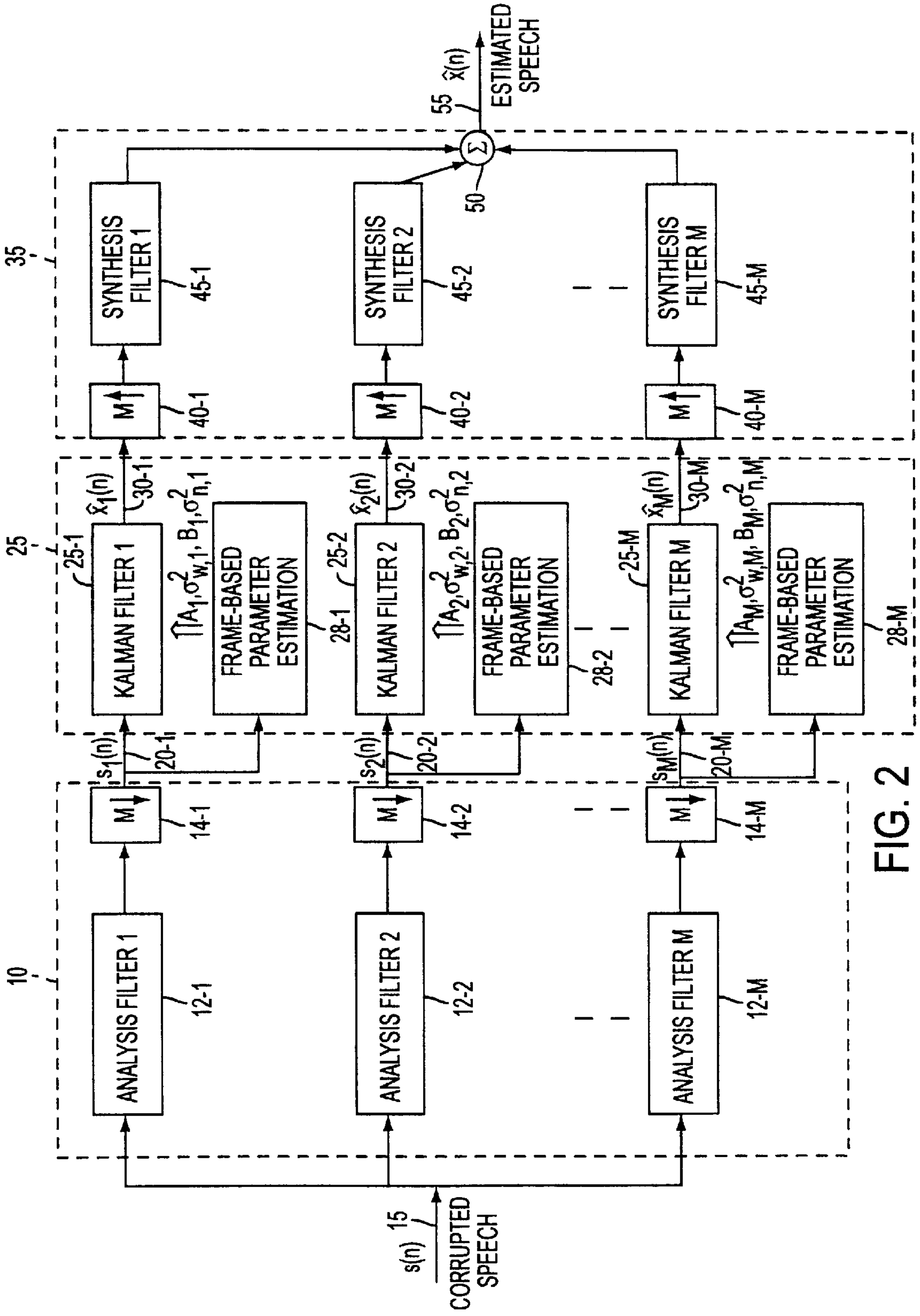
FIG. 2 is a block diagram showing details of the block diagram of FIG. 1.

An exemplary embodiment in accordance with the speech enhancement system of the present invention is illustrated in FIGS. 1 and 2. More specifically, in FIG. 1, the noise corrupted speech signals s(n), may be modeled as $$s(n)=x(n)+v(n) \tag{22}$$

where x(n) is a fullband speech signal and v(n) is noise. Signal s(n) is input on signal line 15 to speech enhancement circuit 1, which includes an M-channel analysis filter bank and M-fold decimators 10, a multichannel frame-based Kalman filter bank 25 and a multichannel synthesis filter and expander bank 35, from which an estimated speech signal $\hat{x}$(n) is output on line 55.

The noise corrupted speech signal s(n) is divided into a set of decimated subband signals $s_i$(n) (i=1, . . . , M) by the M-channel analysis filter bank and decimator bank 10 which includes a plurality of analysis filters 12-1 through 12-M and a plurality of decimators 14-1 through 14-M as shown in FIG. 2. In particular, the bank of bandpass filters 12-1 through 12-M divide the noise corrupted speech s(n) into subband speech signals which are decimated (i.e., down-sampled) by the bank of decimators 14-1 through 14-M. In other words, the noise corrupted speech signal s(n) is divided by the multichannel analysis filter and decimator bank 10 into a plurality of decimated subband signals $s_i$(n) (i=1, . . . , M) in which the noisy subband speech signals $s_i$(n) on signal lines 20-1 through 20-M can be expressed by the following equation $$s_i(n)=x_i(n)+v_i(n),\ i=1,\ldots,M \tag{23}$$

where $x_i$(n) and $v_i$(n) are subband signals of the fullband signals x(n) and v(n), respectively. If v(n) is white, $v_i$(n) can be approximated as white; if v(n) is colored, $v_i$(n) is approximated as colored. $v_i$(n) is modeled as an AR process.

Each subband speech signal $s_i$(n) is divided into consecutive frames; in each frame, the signal is modeled as a stationary process. Because the subband speech signals $x_i$(n) and $v_i$(n) have simpler spectra than their fullband counterpart signals x(n) and v(n), they can be modeled well as lower-order AR signals. The Kalman filtering operations are thus greatly simplified. For example, assuming that AR(p) denotes the p-th order AR model, if AR(p) is used, then $x_i$(n) can be expressed as $$x_i(n)=\sum_{j=1}^{p}a_{i,j}x_i(n)+w_i(n) \tag{24}$$

where $w_i$(n) is a zero-mean white Gaussian process noise with a variance of $\sigma_{w_i}^2$. Equation (24) is the state equation for the subband speech signal $x_i$(n). That is, combining equation (24) with the measurement equation (23), the subband speech signals $s_i$(n) can be applied to a bank of Kalman filters 25-1 through 25-M. The filtered subband signals on lines 30-1 through 30-M, i.e., the best estimate signals denoted as $\hat{x}_i$(n), i=1, . . . , M, are up-sampled by expanders 40-1 through 40-M, and then, frame-by-frame, are processed by a multichannel synthesis filter bank of filters 45-1 through 45-M and input to adder 50 to reconstruct the best-estimate fullband filtered signal $\hat{x}$(n).

To process the noisy subband speech signals $s_i$(n), a plurality of low-order Kalman filters 25-1 through 25-M are applied to the signal lines 20$_i$, i=1, . . . M, to carry out the speech enhancement operation. In particular, the filtering operation is carried out by the low-order subband Kalman filters 25-1 through 25-M and the parameter estimation operation is carried out in parameter estimation units 28-1 through 28-M according to a subband algorithm which uses the correlation subtraction method of the present invention and solves the Yule-Walker equations to obtain the AR parameters.

In the prior art technique described above, the parameter estimation operation is carried out using the Kalman-EM algorithm. The complexity of this algorithm makes the implementation of the resulting speech enhancement system difficult and expensive.

In contrast, parameter estimation units 28-1 through 28-M of the present invention use a correlation subtraction method which allows the filtering scheme to be carried out with (1) no complex iterations, (2) low computational complexity, and (3) comparable performance relative to the conventional Kalman-EM algorithm. To use the Kalman filter, the AR parameters of the speech and noise signals $x_i$(n) and $v_i$(n) must be estimated. It is known that the AR parameters of a process can be obtained by solving the corresponding Yule-Walker equation (See S. Haykin, "Adaptive Filter Theory," Prentice Hall, 3rd Edition, 1995). To illustrate, let $v_i$(n) be modeled as a q-th order AR process, $V_i(n)=[v_i(n),v_i(n-1),\ldots,v_i(n-q+1)]^T$, and $$R_{vv}^i=E\{V_i(n)V_i(n)^T\},\ P_v^i=E\{v_i(n+1)V_i(n)\} \tag{25}$$

Then, the AR coefficients of $v_i$(n), $B_i=[b_{i,1},b_{i,2},\ldots,b_{i,q-1}]^T$ can be found as $$B_i=(R_{vv}^i)^{-1}P_v^i \tag{26}$$

The corresponding driving noise variance is $$\sigma_{\eta,i}^2=r_{vv}^i(0)-\sum_{j=1}^{q}b_{i,j}r_{vv}^i(j) \tag{27}$$

where $r_{vv}^i(j)$ is the autocorrelation function of $v_i$(n). It should be noted that entries of $R_{vv}^i$ and $P_v^i$ also consist of the autocorrelation function $r_{vv}^i(\tau)$ for τ=0,1, . . . , q. Then $r_{vv}^i(\tau)$ can be estimated in non-speech intervals. As is well known, for a short period of time, a speech signal can be seen as stationary. Its subband signal can also be seen as stationary. Thus, the subband speech signal can be divided into a plurality of consecutive frames, and the subband speech signal in each frame can be modeled as an AR process. As in equation (26), the AR parameters of the subband speech can be obtained if the autocorrelation function can be estimated for each frame. The present invention employs a correlation subtraction algorithm to estimate the autocorrelation function of the subband speech. This algorithm makes an assumption that the enhanced subband speech signals and the subband noise signals are uncorrelated. Using this assumption, let $r_{ss}^i(\tau)$ and $r_{xx}^i(\tau)$ denote the autocorrelation functions of $s_i(n)$ and $x_i(n)$, respectively, then $$\begin{aligned} r_{ss}^i(\tau) &= E\{s_i(n+\tau)s_i(n)\} \\ &= E\{[x_i(n+\tau)+v_i(n+\tau)][x_i(n)+v_i(n)]\} \\ &= E\{x_i(n+\tau)x_i(n)\}+E\{v_i(n+\tau)v_i(n)\} \\ &= r_{xx}^i(\tau)+r_{vv}^i(\tau) \end{aligned} \tag{28}$$

Thus, the autocorrelation function of the enhanced subband speech signal can be obtained as $$r_{xx}^i(\tau)=r_{ss}^i(\tau)-r_{vv}^i(\tau) \tag{29}$$

where $r_{xx}^i(\tau)$ represents a correlation function of an enhanced subband speech signal $x_i(n)$; $r_{ss}^i(\tau)$ represents a correlation function of a noise-corrupted subband speech signal $s_i(n)$; and $r_{vv}^i(\tau)$ represents a correlation function of additive subband noise $v_i(n)$. To have more flexibility, a constant a can be introduced into equation (29), such that $$r_{xx}^i(\tau)=r_{ss}^i(\tau)-\alpha r_{vv}^i(\tau) \tag{30}$$

where $\alpha$ is a constant between 0 and 1. Equation (30) represents the correlation subtraction method of the present invention, which is employed to obtain the autocorrelation function $r_{xx}^i(\tau)$ of the enhanced subband speech signal $x_i(n)$. Let the AR order of $x_i(n)$ be p, then $$X_i(n)=[x_i(n),x_i(n-1), \ldots, x_i(n-p+1)^T]R_{xx}^i=E\{X_i(n)X_i(n)^T\}P_{vv}^i=E\{x_i(n+1)X_i(n)\} \tag{31}$$

Similar to that in equation (26), the AR parameters for the i-th subband signal, $A_i=[a_{i,1},a_{i,2}, \ldots, a_{i,q-1}]^T$ can be obtained by $$A_i=[R_{xx}^i]^{-1}P_x^i \tag{32}$$

The corresponding driving noise variance is then $$\sigma_{w,i}^2 = r_{xx}^i(0) - \sum_{j=1}^{p} a_{i,j} r_{xx}^i(j) \tag{33}$$

Although matrix inversions are involved in the parameter estimation, if the AR order is low, these operations can be carried out easily. As to the autocorrelation functions, the time average is taken to obtain the associated estimates. For example, $$r_{ss}^i(\tau) = \frac{1}{N}\sum_{m=1}^{N-\tau} s_i(m+\tau)s_i(m) \tag{34}$$

where N is the frame size and m is the sequence index inside a particular frame.

Referring again to FIGS. 1 and 2, the filtered best-estimate subband signals $\hat{x}_i(n)$ on lines 30-1 through 30-M are subsequently processed by a multichannel synthesis filter and expander bank 35. In FIG. 2, the multichannel synthesis filter and expander bank 35 comprises interpolation filters 40-1 through 40-M, bandpass filters 45-1 through 45-M, and an adder 50. The interpolation filters 40-1 through 40-M interpolate the filtered subband signals $\hat{x}_i(n)$ such that a signal spectrum of each subband signal $\hat{x}_i(n)$ is, in effect, relocated about the center frequency of the corresponding one of the bandpass filters 45-1 through 45-M. The filtered speech signals from the bandpass filters 45-1 through 45-M are then combined by the adder 50 (e.g., summing amplifier) to provide the enhanced best-estimate speech signal $\hat{x}(n)$. in other words, the multichannel synthesis filter and expander bank 35 processes the filtered subband signals $\hat{x}_i(n)$ through filtering, up-sampling, and summing to provide the estimated speech signal $\hat{x}(n)$ on line 55.

To demonstrate the performance of the speech enhancement system of the present invention, a simulation was performed using real speech uttered by a female speaker contaminated with white and colored (motorcycle or automobile) noise, and a five-band cosine modulated filter bank (CMFB) with a 20 filter length. The input SNR was held at 5 dB. The SNR improvement (dB) was used as the performance measure. The results of the simulations, which are expressed in terms of SNR, are shown in TABLE 1. The equation for SNR is defined in reference [2]. In TABLE 1, (i,j) denote that the AR order of the subband speech is i and that of the subband noise is j. For simplicity, i and j are the same for all subbands.

For comparison, the same simulation is performed by using the full-band Kalman-EM algorithm proposed in reference [2]. Let $\theta=\{a'_i, s, \sigma_w^2\}$. This algorithm first divides the speech signal into frames and then iterates the following two steps for each frame: (1) use $\theta^{(l)}$ to perform Kalman filtering and (2) use the estimate of x(n) to calculate $\theta^{(l+1)}$ where l is the number of iterations. In the following tables, the results are labeled for EM-l, for l=1,2,3. For the Kalman-EM algorithm, the $4^{th}$ order AR model is used for speech and the $2^{nd}$ for noise. In Table 1, SB refers to the Kalman-SB algorithm of the present invention while EM stands for the Kalman-EM fullband algorithm of the prior art.

TABLE 1

| AR Modeling (i,j) | White (SNR in dB) | Motorcycle (SNR in dB) | Automobile (SNR in dB) |
|---|---|---|---|
| SB (0,0) | 5.39 | 5.81 | 3.53 |
| SB (1,0) | 5.50 | 5.82 | 3.43 |
| SB (0,1) | 5.40 | 5.81 | 5.70 |
| SB (1,1) | 5.49 | 5.84 | 6.98 |
| SB (2,0) | 5.38 | 5.64 | 2.94 |
| SB (0,2) | 5.40 | 5.82 | 7.51 |
| SB (2,2) | 5.19 | 5.57 | 9.05 |
| EM-1 (4,2) | 3.70 | 3.51 | 4.97 |
| EM-2 (4,2) | 5.40 | 5.16 | 7.37 |
| EM-3 (4,2) | 5.63 | 5.84 | 8.20 |

Figure 3:
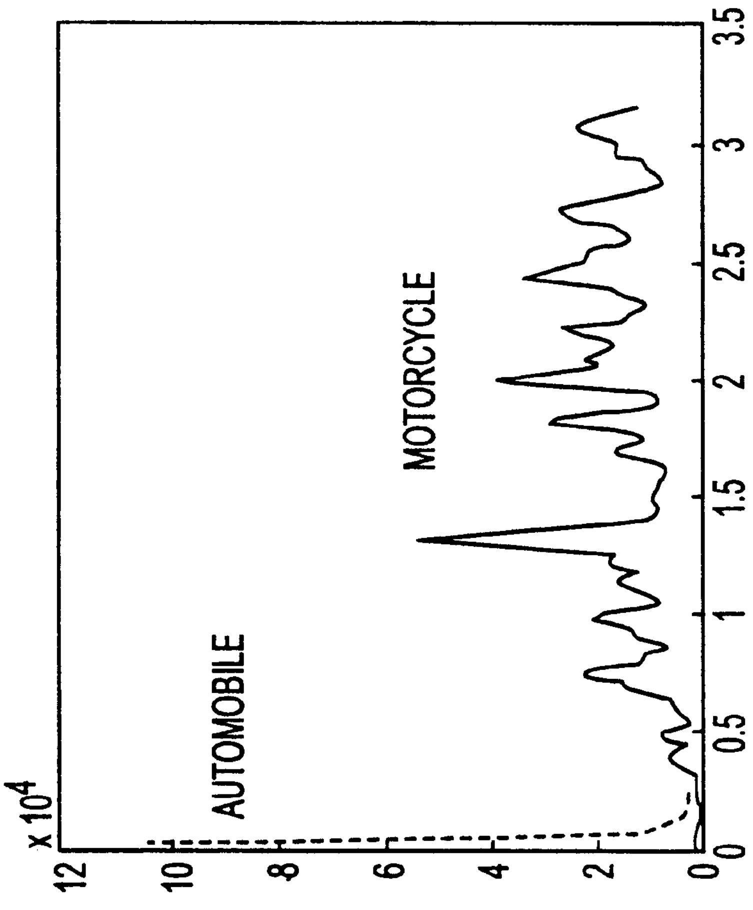
FIG. 3 illustrates power spectra of colored noises.

As shown in TABLE 1, all AR modelings yield similar results for white and motorcycle noise except for EM-1 which is the poorest among all methods. The (0,2) modeling used in the present invention has a better performance than EM-2 (4,2) for all noises and (2,2) achieves the highest improvement for automobile noise. For automobile noise, modeling the noise with a higher AR order yields significantly better results. If the total AR order is fixed, it will be preferable to have a higher order for noise than for speech. The power spectra of the colored noises are plotted in FIG. 3. From FIG. 3, it is seen that automobile noise is a narrowband signal while motorcycle noise is a wideband signal. Thus, a higher order is needed to model the automobile noise. I.e., for a narrowband noise such as automobile noise, a higher order modeling such as (0,2), (1,1) or (2,2) would yield a relatively good performance for the speech enhancement system of the present invention. On the other hand, for a wideband noise such as motorcycle noise, a lower order modeling such as (0,0) would be sufficient to yield excellent results with very low computational complexity.

Computational complexities for Kalman-SB (2,2) and (0,2) and Kalman-EM-1 (4,2) are compared and shown in TABLE 2, where MPU represents multiplications per unit time, ADU represents divisions per unit time, ADU represents additions per unit time, and "Autocor." stands for autocorrelation.

TABLE 2

| OP-ERA- | EM-1 (4,2) | | | Kalman-SB (2,2) | | | Kalman-SB (0,2) | | |
|---|---|---|---|---|---|---|---|---|---|
| TIONS | MPU | DVU | ADU | MPU | DVU | ADU | MPU | DVU | ADU |
| Kalman | 120 | 6 | 111 | 56 | 4 | 51 | 16 | 2 | 15 |
| $R^{-1}P$ | — | — | — | — | — | — | — | — | — |
| Auto-cor. | 5 | — | 5 | 3 | — | 3 | 1 | — | 1 |
| CMFB | — | — | — | 4 | — | 4 | 4 | — | 4 |
| Total | 127 | 6 | 116 | 63 | 4 | 58 | 21 | 2 | 20 |

TABLE 3 shows a rough comparison of the computational complexities for the conventional Kalman-EM algorithm and the Kalman-SB algorithm of the present invention.

TABLE 3

| | SB (2,2) | SB (0,2) |
|---|---|---|
| Kalman-EM-1(4,2) | 1/2 | 1/6 |
| Kalman-EM-2(4,2) | 1/4 | 1/12 |
| Kalman-EM-3(4,2) | 1/6 | 1/18 |

Kalman filtering using a frame-based approach in the subband domain is particularly effective for enhancing speech corrupted with additive noise, achieving both performance enhancement and significantly reduced computational complexity. For wideband noise, a (0,0) modeling gives good results and a filtering scheme with very low computational complexity. For narrowband noise, a higher order modeling such as (2,2) can give much better performance, although with increased computational complexity as compared with lower order modeling. The invention employs a simple estimate algorithm to obtain the speech parameters from noisy data. The computational complexity of the Kalman filter can be reduced using a so-called measurement difference method.

While particular embodiments of the present invention have been shown and described, it will be apparent to those skilled in the art that various changes and modifications may be made therein without departing from the spirit or scope of the invention. Accordingly, it is intended that the appended claims cover such changes and modifications that come within the spirit and scope of the invention.

What is claimed is:

1. An apparatus for processing an observed noise-corrupted speech signal to obtain an enhanced speech signal, said apparatus comprising:

a first filtering means for decomposing said observed speech signal into a plurality of different subband observed speech signals, each subband observed speech signal being characterized by a respective portion of the frequency spectrum;

a second filtering means including parameter estimating means for estimating parameters of enhanced subband speech signals and a Kalman filtering means employing said parameters to filter said subband observed speech signals according to a Kalman filtering algorithm to provide said enhanced subband speech signals; and a third filtering means for reconstructing said enhanced subband speech signals into an enhanced fullband speech signal.

2. The apparatus as in claim 1, further comprising means for converting each of said subband observed speech signals output by said first filtering means into a sequence of speech frames.

3. The apparatus as in claim 2, wherein said parameters are autoregressive parameters and said parameter estimating means employs a correlation subtraction algorithm to obtain the autocorrelation function of the enhanced subband speech signals in each speech frame and applies a Yule-Walker equation to said autocorrelation function to obtain said autoregression parameters in each speech frame.

4. The apparatus of claim 3, wherein said correlation subtraction algorithm comprises the following operations for each subband of said plurality of different subband observed signals:

(i) estimating the autocorrelation function of a subband noise signal during a non-speech interval comprising at least one non-speech frame, (ii) calculating the autocorrelation function of said subband observed speech signals in each speech frame of said subband, and (iii) obtaining the autocorrelation function of said enhanced subband speech signals in each speech frame of said subband by subtracting said autocorrelation function of said subband noise signal from said autocorrelation function of said subband observed speech signals.

5. The apparatus of claim 4, wherein operation (iii) comprises obtaining the autocorrelation function of said enhanced subband speech signals by subtracting said autocorrelation function of said subband noise signal multiplied by $\alpha$ from said autocorrelation function of said subband observed speech signals, where $\alpha$ is a constant between zero and one.

6. The apparatus of claim 4, wherein said at least one non-speech frame is positioned ahead of said sequence of speech frames.

7. The apparatus of claim 1, wherein said Kalman filtering algorithm of said second filtering means models said enhance band speech signals as low-order AR processes.

8. The apparatus of claim 1, wherein said first filtering means comprises a plurality of first bandpass filters.

9. The apparatus of claim 8, wherein said apparatus further includes a plurality of decimators for downsampling outputs from said first bandpass filters.

10. The apparatus of claim 1, wherein said Kalman filtering means comprises a plurality of low-order Kalman filters for executing said subband Kalman algorithm.

11. The apparatus of claim 1, wherein said third filtering means comprises a plurality of second bandpass filters.

12. The apparatus of claim 11, wherein said third filtering means further comprises a plurality of expanders for up-sampling outputs from said second filtering means and providing expanded signals to said second bandpass filters to output said enhanced fullband speech signal.

13. A method of processing an observed noise-corrupted speech signal to obtain an enhanced speech signal, said method comprising the steps of:

(a) decomposing said observed speech signal into a plurality of different subband observed speech signals, each subband observed speech signal being characterized by a respective portion of the frequency spectrum;

(b) estimating parameters of enhanced subband speech signals and employing said parameters to filter said subband observed speech signals according to a Kalman filtering algorithm to provide said enhanced subband speech signals; and (c) reconstructing said enhanced subband speech signals into an enhanced fullband speech signal.

14. The method as in claim 13, further comprising converting each of said subband observed speech signals obtained in step (a) into a sequence of speech frames.

15. The method as in claim 14, wherein said parameters are autoregressive parameters and said parameter estimating means employs a correlation subtraction algorithm to obtain the autocorrelation function of the enhanced subband speech signals in each speech frame and applies a Yule-Walker equation to said autocorrelation function to obtain said autoregression parameters in each speech frame.

16. The method as in claim 15, wherein said correlation subtraction algorithm comprises for each subband of said plurality of different subband observed signals:

(i) estimating the autocorrelation function of a subband noise signal during a non-speech interval comprising at least one non-speech frame, (ii) calculating the autocorrelation function of said subband observed speech signals in each speech frame of said subband, and (iii) obtaining the autocorrelation function of said enhanced subband speech signals in each speech frame of said subband by subtracting said autocorrelation function of said subband noise signal from said autocorrelation function of said subband observed speech signals.

17. The method of claim 16, wherein step (iii) comprises obtaining the autocorrelation function of said enhanced subband speech signals by subtracting said autocorrelation function of said subband noise signal multiplied by $\alpha$ from said autocorrelation function of said subband observed speech signals, where $\alpha$ is a constant between zero and one.

18. The method of claim 17, wherein said at least one non-speech frame is positioned ahead of said sequence of speech frames.

19. The method as in claim 13, further comprising, prior to step (b), downsampling said plurality of subband observed speech signals.

20. The method as in claim 14, further comprising up-sampling said enhanced subband signals provided by step (b) and bandpass filtering said enhanced subband signals before providing them to an adder for summation.

21. The method as in claim 13, wherein said parameters are autoregression parameters.

22. An apparatus for processing an observed noise-corrupted speech signal to obtain an enhanced speech signal, said apparatus comprising:

a first means for converting said observed speech signal into a plurality of different subband observed speech signals modeled as low-order autoregressive processes characterized by a respective portion of the frequency spectrum and for converting said subband observed speech signals into a sequence of speech frames, said first means comprising a plurality of bandpass filters and decimators for downsampling outputs from said bandpass filters;

a second means comprising parameter estimating means for estimating autoregression parameters of enhanced subband speech signals frame-by-frame and a plurality of low-order Kalman filters for employing said parameters frame-by-frame to filter said subband observed speech signals according to a subband Kalman filtering algorithm to provide said enhanced subband speech signals;

a third means comprising a plurality of second bandpass filters and a plurality of expanders for up-sampling outputs from said second means and providing expanded signals to said second bandpass filters; and an adder for summing outputs of said second bandpass filters to reconstruct said enhanced subband speech signals into an enhanced fullband speech signal.

23. The apparatus as in claim 22, wherein said parameters are autoregressive parameters and said parameter estimating means employs a correlation subtraction algorithm to obtain the autocorrelation function of the enhanced subband speech signals and applies a Yule-Walker equation to said autocorrelation function of the enhanced subband speech signals to obtain said autoregression parameters in each voice frame.

24. The apparatus as in claim 23, wherein said correlation subtraction algorithm comprises the following operations for each subband of said plurality of different subband observed signals:

(i) estimating the autocorrelation function of a subband noise signal during a non-speech interval comprising at least one non-speech frame, (ii) calculating the autocorrelation function of said subband observed speech signals in each speech frame of said subband, and (iii) obtaining the autocorrelation function of said enhanced subband speech signals in each speech frame of said subband by subtracting said autocorrelation function of said subband noise signal from said autocorrelation function of said subband observed speech signals.

25. The apparatus as in claim 24, wherein operation (iii) comprises obtaining the autocorrelation function of said enhanced subband speech signals by subtracting said autocorrelation function of said subband noise signal multiplied by $\alpha$ from said autocorrelation function of said subband observed speech signals, where is a constant between zero and one.

26. The apparatus of claim 25, wherein said at least one non-speech frame is positioned ahead of said sequence of speech frames.

* * * * *